United States Patent [19]
Fontanazzi

[11] Patent Number: 6,038,838
[45] Date of Patent: Mar. 21, 2000

[54] PACKAGING UNIT FOR CONTINUOUSLY PRODUCING SEALED PACKAGES, CONTAINING POURABLE FOOD PRODUCTS, FROM A TUBE OF PACKAGING MATERIAL

[75] Inventor: Paolo Fontanazzi, Modena, Italy

[73] Assignee: Tetra Laval Holdings & Finance S.A., Pully, Switzerland

[21] Appl. No.: 09/080,262

[22] Filed: May 18, 1998

[30] Foreign Application Priority Data

Jun. 27, 1997 [EP] European Pat. Off. .............. 97830314

[51] Int. Cl.[7] ........................................................ B65B 9/06
[52] U.S. Cl. ................................................ 53/551; 53/552
[58] Field of Search ...................... 53/551, 552, 374.5, 53/374.6, 375.4; 493/302

[56] References Cited

U.S. PATENT DOCUMENTS

| | | |
|---|---|---|
| Re. 33,467 | 12/1990 | Steck ........................................ 53/451 |
| 2,738,631 | 3/1956 | Järund . |
| 2,741,079 | 4/1956 | Rausing . |
| 2,784,540 | 3/1957 | Järund . |
| 2,966,021 | 12/1960 | Lane ........................................ 53/552 |
| 3,300,944 | 1/1967 | Thesing . |
| 3,320,718 | 5/1967 | Thesing . |
| 3,388,525 | 6/1968 | Thesing et al. . |
| 3,444,792 | 5/1969 | Thesing et al. . |
| 3,555,652 | 1/1971 | Ignell . |
| 3,729,894 | 5/1973 | Stohlquist . |
| 3,925,963 | 12/1975 | Greenawalt ................................ 53/552 |
| 4,074,961 | 2/1978 | Reil . |
| 4,387,547 | 6/1983 | Reil . |
| 4,817,366 | 4/1989 | Konzal et al. . |
| 4,881,360 | 11/1989 | Konzal et al. . |
| 5,001,891 | 3/1991 | Abate ........................................ 53/548 |
| 5,155,980 | 10/1992 | Mansson ................................... 53/551 |

FOREIGN PATENT DOCUMENTS 1786450  4/1977  Germany .

*Primary Examiner*—John Sipos
*Attorney, Agent, or Firm*—Burns, Doane, Swecker & Mathis, L.L.P.

[57] ABSTRACT

A packaging unit (1) for continuously producing aseptic sealed packages (2), containing a pourable food product, from a tube (14) of packaging material filled with the food product; the unit (1) has a first and second chain conveyor (10, 11) respectively having a number of jaws (12) and a number of counter-jaws (13), which interact with and grip the tube (14) to heat-seal cross sections of the tube; and the chain conveyors (10, 11) also have half shell elements (38) for controlling the volume of the packages (2), and which are connected to respective jaws (12) and counter-jaws (13) and cooperate with a relative cam (44) for controlling the relative movement of the half shell elements to and from the supply path (A) of the tube (14) of packaging material.

9 Claims, 11 Drawing Sheets

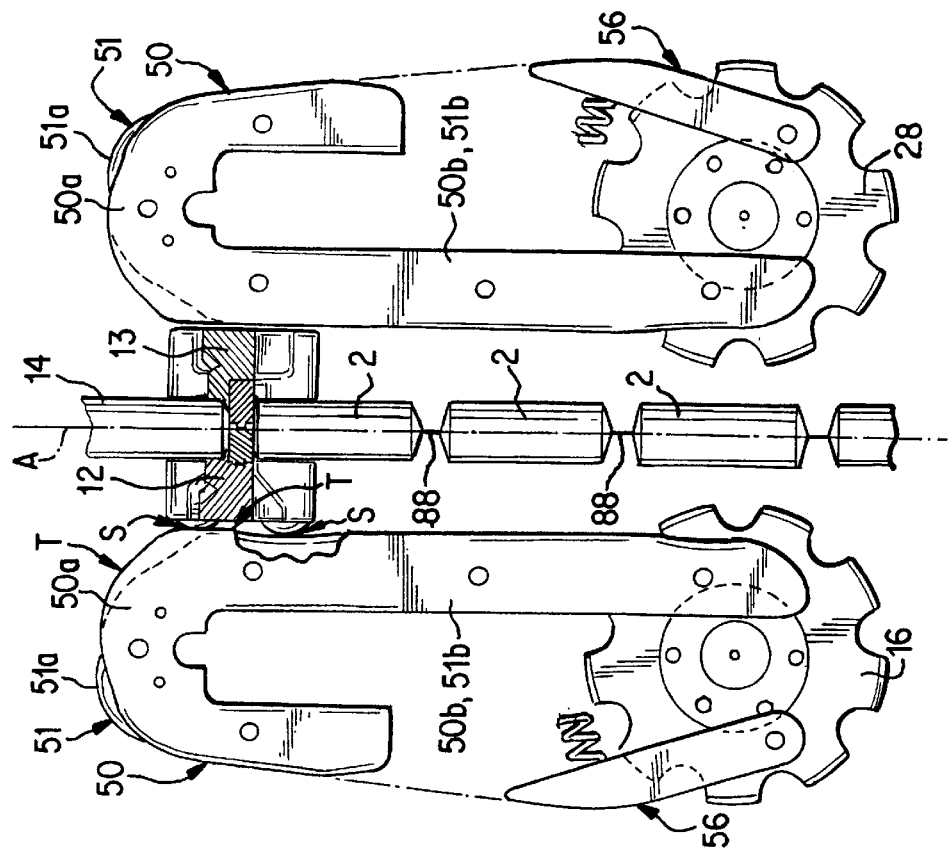
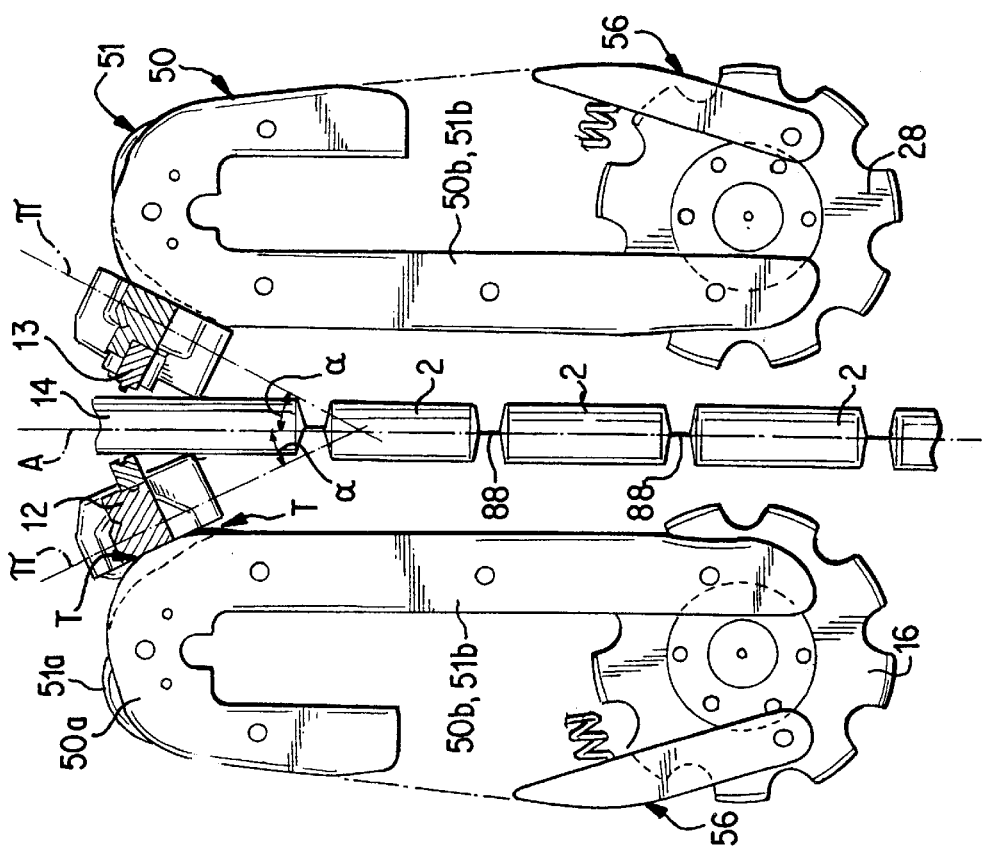

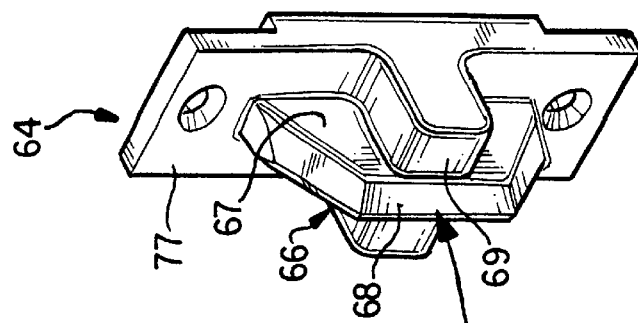
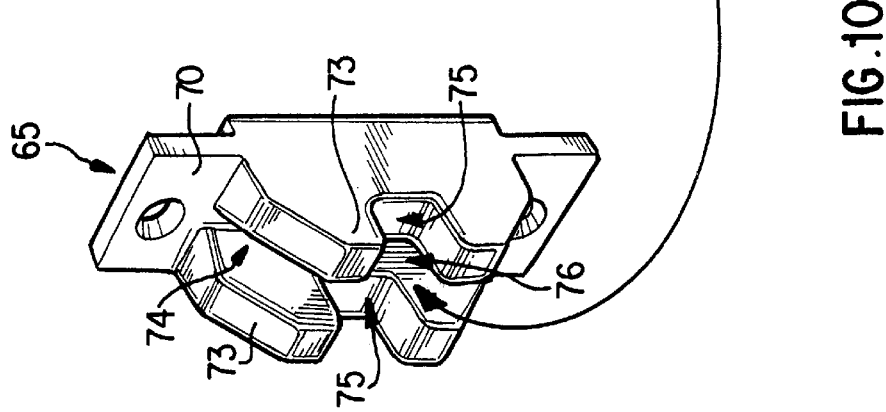
FIG.10
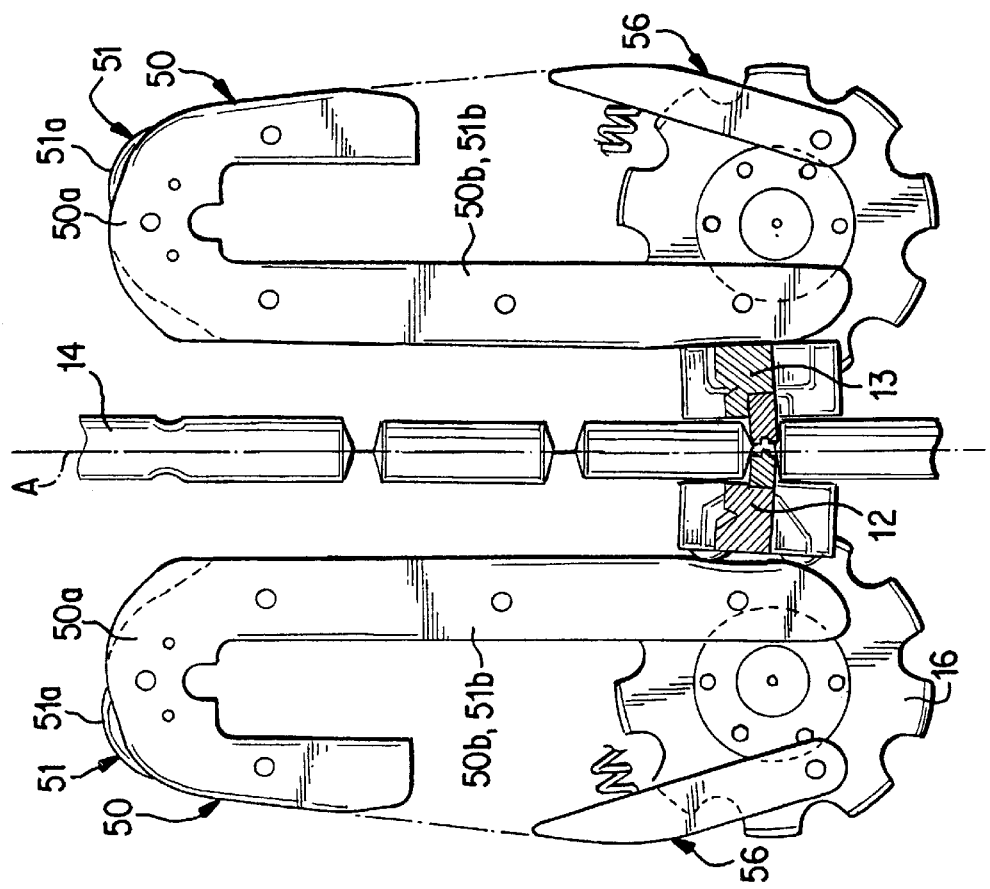
FIG.9

PACKAGING UNIT FOR CONTINUOUSLY PRODUCING SEALED PACKAGES, CONTAINING POURABLE FOOD PRODUCTS, FROM A TUBE OF PACKAGING MATERIAL

The present invention relates to a packaging unit for continuously producing aseptic sealed packages, containing pourable food products, from a tube of packaging material.

More specifically, the packaging unit according to the present invention provides for producing substantially parallelepiped aseptic sealed packages.

Many pourable food products, such as fruit juice, pasteurized or UHT (ultra-high-temperature treated) milk, wine, tomato sauce, etc., are sold in packages made of sterilized packaging material.

A typical example of such a package is the parallelepiped packaging container for liquid or pourable food products known by the name of Tetra Brik Aseptic (registered trademark), which is formed by folding and sealing a strip-rolled packaging material. The rolled packaging material comprises layers of fibrous material, e.g. paper, covered on both sides with thermoplastic material, e.g. polyethylene; and the side of the packaging material eventually contacting the food product in the package also comprises a layer of barrier material, e.g. an aluminium sheet, in turn covered with a layer of thermoplastic material.

As is known, packages of the above type are produced on fully automatic packaging machines, on which a continuous tube is formed from the packaging material supplied in strip form. The strip of packaging material is sterilized on the packaging machine, e.g. by applying a chemical sterilizing agent, such as a hydrogen peroxide solution; following sterilization, the sterilizing agent is removed, e.g. vaporized by heating, from the surfaces of the packaging material; and the strip of packaging material so sterilized is kept in a closed sterile environment, and is folded and sealed longitudinally to form a tube.

The tube is filled with the sterilized or sterile-processed food product, and is sealed at equally spaced cross sections at which it is then cut into pillow-pack packets, which are subsequently folded mechanically into parallelepiped packages.

Packaging machines of the above type are known, which comprise two chain conveyors defining respective endless paths and respectively fitted with a number of jaws and counter-jaws. The two paths comprise respective branches substantially facing and parallel to each other, and between which the tube of packaging material is fed, so that the jaws on one conveyor cooperate, along said branches of the respective paths, with corresponding counter-jaws on the other conveyor to grip the tube at a number of successive cross sections and so seal the packages.

Machines of this sort are illustrated in numerous prior patents, such as U.S. Pat. No. 3,300,944, U.S. Pat. No. 3,388,525, U.S. Pat. No. 5,001,891, and have been experimented for some time.

Chain conveyor machines of the above type comprise control elements for controlling the volume of the packages as they are being formed, and which substantially comprise half shells fitted to the respective chain conveyors and cooperating in pairs to surround the tube of packaging material as the jaws and counter-jaws seal the tube. As the volume control elements form part of, and define respective links of, the conveyor chains, the movement of the elements is determined by the paths defined by the chains.

To the Applicant's knowledge, known chain conveyor machines have failed, as yet, to find a satisfactory practical application, due to failure to provide for a reliable production process ensuring absolutely no damage to the packages, and so safeguarding the aseptic characteristics of the contents.

More specifically, one of the drawbacks of known machines is the possibility of the packaging material being "pinched" between a pair of volume control elements as the elements are brought together, thus tearing the packaging material and resulting in stoppage of the machine. Even worse, the damage to the packaging material may be limited to the barrier material and therefore go undetected, thus resulting in the sale of nonsterile packages at grave risk to the consumer.

The above drawback is due to the impossibility of accurately controlling interaction between the volume control elements and the tube of packaging material.

It is an object of the present invention to provide a packaging unit for continuously producing aseptic sealed packages containing pourable food products, and which provides for eliminating the aforementioned drawbacks typically associated with known machines.

According to the present invention, there is provided a packaging unit for continuously producing aseptic sealed packages, containing a pourable food product, from a tube made of heat-seal packaging material in sheet form and fed along a vertical supply path; said tube being filled with said food product; and said unit comprising:

a first chain conveyor having a number of jaws, and defining an endless first path along which said jaws are fed;

a second chain conveyor having a number of counter-jaws, and defining an endless second path along which said counter-jaws are fed;

said first and said second path comprising respective work portions adjacent to said supply path of the tube of packaging material, and extending substantially symmetrically on opposite sides of said supply path, so that said jaws of said first conveyor cooperate with respective said counter-jaws of said second conveyor along at least part of the respective said work portions, to grip said tube at respective equally spaced cross sections;

at least said jaws comprising heating means for heat-sealing said tube;

said chain conveyors also comprising respective volume control devices for controlling the volume of the packages being formed, and each of which comprises a number of half shell elements cooperating with respective half shell elements on the other chain conveyor to define the volume of the packages being formed;

characterized in that said half shell elements are fitted individually to respective said jaws and counter-jaws, and are so connected to said respective jaws and counter-jaws as to be permitted a relative movement to and from said supply path of said tube of packaging material; said volume control devices also comprising, for each said chain conveyor, guide means for guiding said half shell elements, and which extend along said work portions of the respective said paths, and provide for controlling said relative movement of said half shell elements.

According to the present invention, therefore, the movement of the half shell elements is controlled substantially independently with respect to that of the respective jaws and counter-jaws, so as to provide for optimum interaction between the half shell elements and the packaging material.

A preferred, non-limiting embodiment of the present invention will be described by way of example with reference to the accompanying drawings, in which:

FIGS. 5 to 9 show schematic side views, with parts removed for clarity, of the FIG. 1 unit with a jaw and respective counter-jaw in successive operating positions;

FIG. 10 shows a view in perspective of complementary parts of the jaw and counter-jaw in FIGS. 3 and 4;

Figure 1:
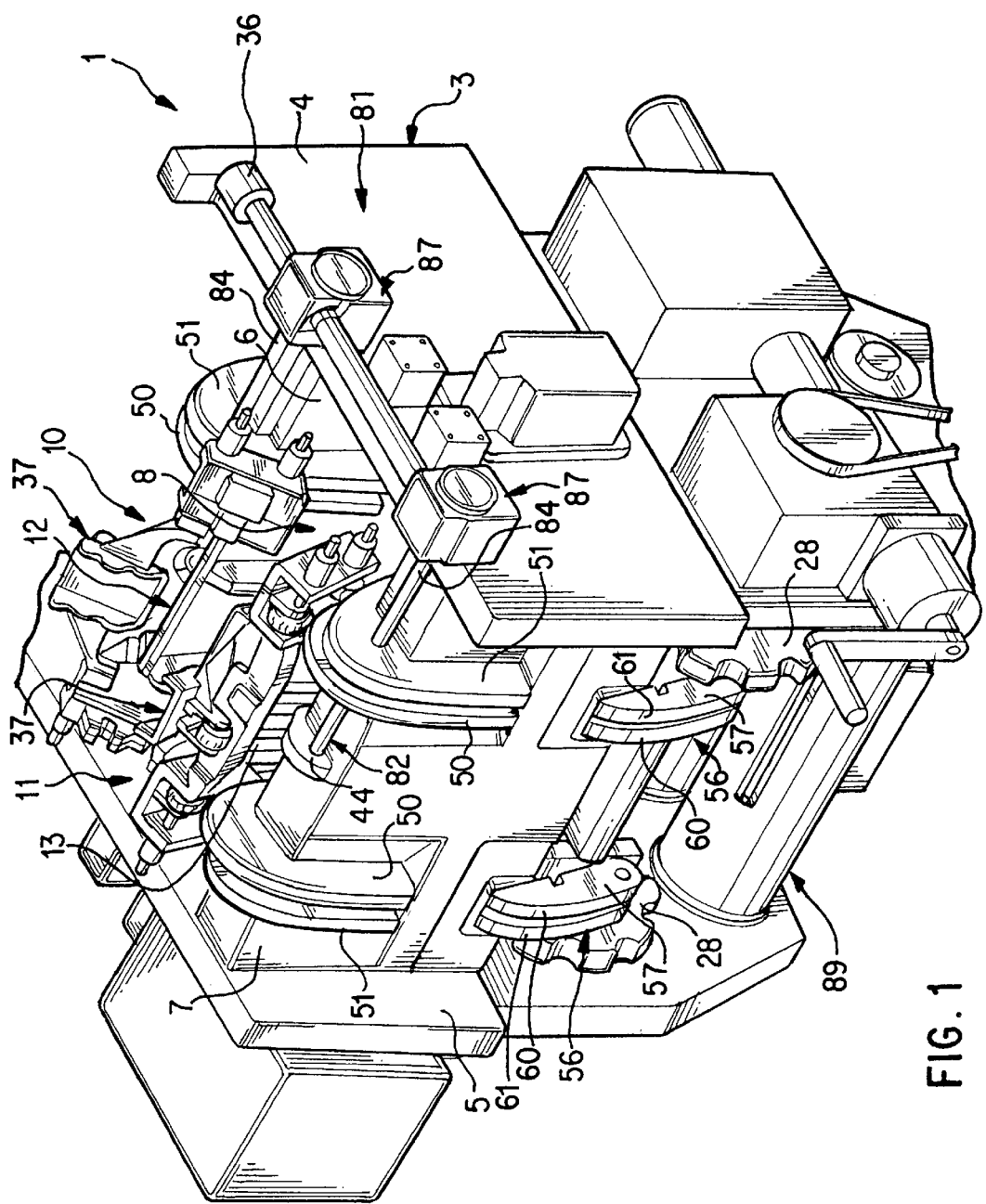
FIG. 1 shows a view in perspective, with parts removed for clarity, of a packaging unit in accordance with the teachings of the present invention.
Figure 2:
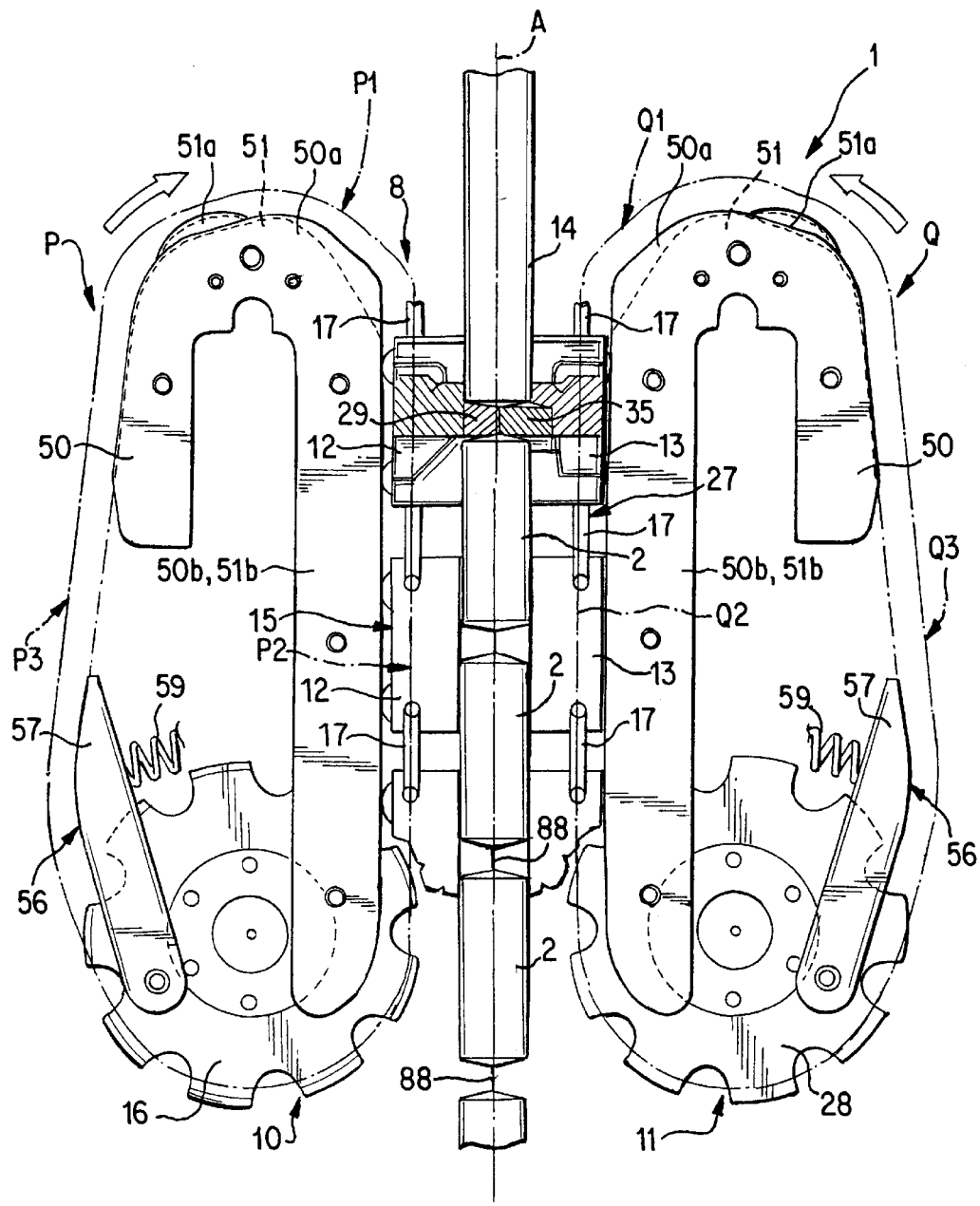
FIG. 2 shows a schematic side view, with parts removed for clarity, of the FIG. 1 unit.

With reference to FIGS. 1 and 2, number 1 indicates a packaging unit for continuously producing, from a tube 14 of packaging material, aseptic sealed packages 2 (FIG. 2) containing a pourable food product, such as pasteurized or UHT milk, fruit juice, wine, etc.

Tube 14 is formed in known manner upstream from unit 1 by longitudinally folding and sealing a strip of heat-seal material, and is filled upstream with the sterilized or sterile-processed food product for packaging.

Unit 1 comprises a frame 3 defined by two side walls 4, 5 and by two parallel transverse walls 6, 7 fitted rigidly between side walls 4, 5 and defining, with side walls 4, 5, an opening 8; and two chain conveyors 10, 11 fitted to frame 3 and respectively comprising jaws 12 (only one shown in FIG. 1) and counter-jaws 13 (only one shown in FIG. 1) cooperating with each other to interact with the tube 14 of packaging material fed along a vertical path A through opening 8.

Conveyors 10 and 11 define respective endless paths P and Q along which jaws 12 and counter-jaws 13 are fed (FIG. 2), and which respectively extend about walls 6 and 7 of frame 3.

Conveyor 10 comprises an articulated chain 15 extending along path P; and two drive wheels 16 meshing with and on both sides of chain 15 at the bottom end of path P. Jaws 12 are an integral part of and define alternate links of chain 15, and are connected to one another in articulated manner by pairs of links 17.

More specifically, each jaw 12 (FIGS. 3 and 4) comprises an elongated main body 20 extending in a direction perpendicular to path A and parallel to wall 6, and having respective end projections 21 and 22, each of which has a projecting first and second pin 23, 24 spaced with respect to each other and having respective axes 25, 26 parallel to the main dimension of body 20. Links 17 pivot on pins 23, 24 of jaws 12 so as to connect pins 23 of one jaw 12 to pins 24 of the adjacent jaw.

Similarly, conveyor 11 comprises an articulated chain 27 extending along path Q; and two drive wheels 28 meshing with chain 27 at the bottom end of path Q. Chain 27 is defined by a number of counter-jaws 13 connected in articulated manner to one another and only described in detail insofar as they differ from jaws 12, and using the same numbering system for any parts similar or corresponding to those described in connection with jaws 12. Briefly, each counter-jaw 13 comprises a main body 20 having pairs of end pins 23, 24 about which links 17 pivot to connect adjacent pairs of counter-jaws 13.

Each jaw 12 comprises an induction heating element 29 fitted to main body 20 in a direction crosswise to path A of tube 14, and which in turn comprises a pair of straight, parallel active surfaces 30, and is supplied electrically by a pair of contact brushes 34 cooperating in sliding manner, in use, with a supply bar (not shown) fitted to frame 3 and extending in the region of path P inside opening 8.

As opposed to a heating element 29, each counter-jaw 13 comprises a pressure bar 35 (FIG. 4), which cooperates with heating element 29 of corresponding jaw 12 to grip a cross section of tube 14 (FIG. 2). On a front surface 46 facing corresponding jaw 12 in use, bar 35 comprises two bands 36 of relatively flexible elastomeric material, which cooperate with the packaging material in opposition to the active surfaces 30 of heating element 29. Bar 35 is connected to main body 20 by two supporting assemblies 47—not forming part of the present invention, and therefore not described in detail—which flex in the direction of the gripping pressure exchanged, in use, between counter-jaw 13 and corresponding jaw 12.

The movement of jaws 12 and counter jaws 13 is controlled by respective pairs of cams 50, 51 fitted to walls 6, 7 of frame 3 and cooperating with respective pairs of rollers 52, 53 fitted to jaws 12 and counter-jaws 13.

Figure 3:
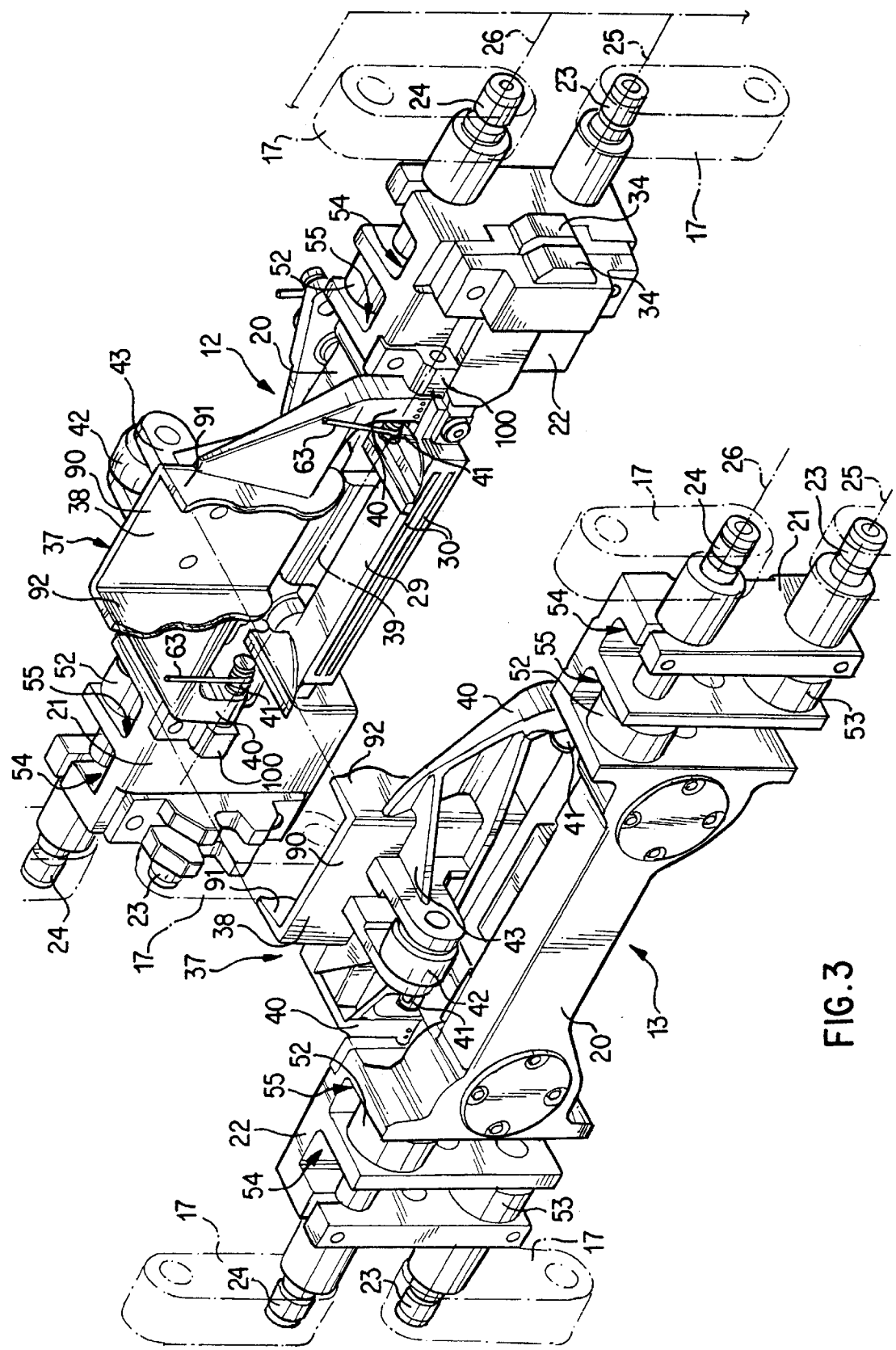
FIGS. 3 and 4 show views in perspective, from opposite sides, of a jaw and corresponding counter-jaw of the FIG. 1 unit.
Figure 4:
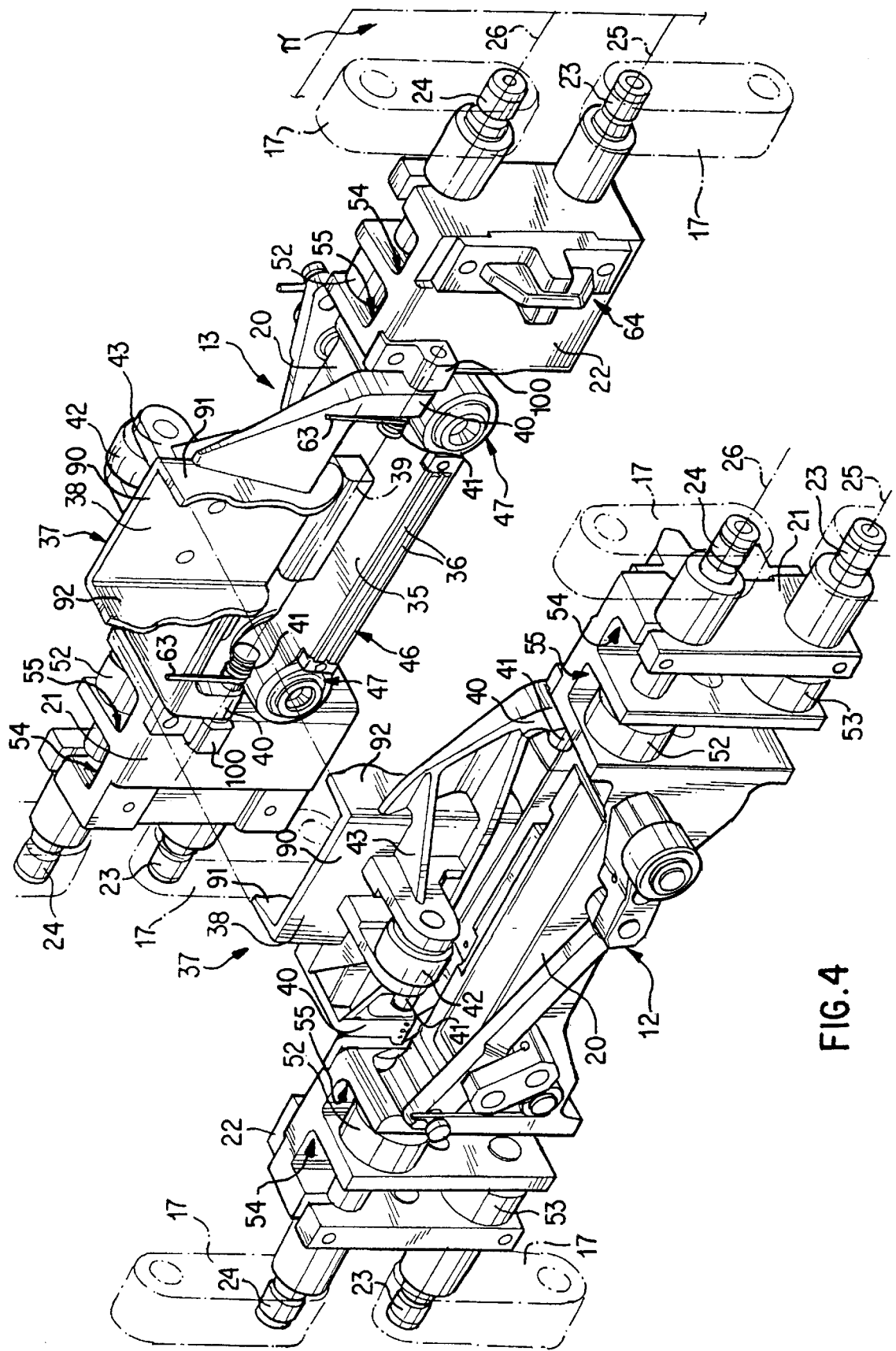

More specifically, and as shown in FIGS. 3 and 4, jaws 12 and counter-jaws 13 each comprise a first pair of rollers 52, 53 fitted idly inside end projection 21 of main body 20, and a second pair of rollers 52, 53 fitted idly inside end projection 22 of main body 20; and projections 21, 22 each comprise a pair of parallel, side by side seats 54, 55 formed on the rear side (i.e. the side facing away from heating element 29 or pressure bar 35) and extending in a direction perpendicular to axes 25, 26 of pins 23, 24 and parallel to the plane defined by axes 25, 26.

The roller 53 in each pair is housed inside a respective outer seat 54 (i.e. closer to the end of body 20) and fitted to a respective pin 23; and the roller 52 in each pair is housed inside a respective inner seat 55 and fitted to a respective pin 24.

Wall 6 (FIG. 1) is fitted with two pairs of cams 50, 51 with which respective pairs of rollers 52, 53 of jaws 12 cooperate in rolling manner; and, similarly, wall 7 is fitted with two pairs of cams 50, 51 with which respective pairs of rollers 52, 53 of counter-jaws 13 cooperate in rolling manner.

Cams 50, 51 comprise respective substantially U-shaped portions 50a, 51a extending about the top edge of respective walls 6, 7 to define, for respective chains 15, 27 of conveyors 10, 11, a transmission opposite respective drive wheels 16 and 28; and respective portions 50b, 51b extending vertically along respective walls 6, 7, inside opening 8. Portions 50a, 51a (FIG. 2) define path portions P1, Q1 along which jaws 12 and counter-jaws 13 approach and contact tube 14 of packaging material; and portions 50b, 51b define facing, parallel path portions P2, Q2 along which jaws 12 and counter-jaws 13 are maintained contacting under pressure to form the seals defining packages 2.

Cams 50, 51 release respective chains 15, 27 at respective portions P3, Q3 of paths P and Q downstream from respective drive wheels 16, 28.

Along portions P3, Q3, chains 15, 27 cooperate with respective pairs of tensioners 56 for so tensioning the chains as to ensure rollers 52, 53 of jaws 12 and counter-jaws 13 are maintained contacting relative cams 50, 51.

Each tensioner 56 comprises a movable shoe 57 hinged about a horizontal axis to a support 58 fixed to wall 6 or 7; and a spring 59 interposed between shoe 57 and wall 6 or 7. On the face facing away from wall 6 or 7, shoe 57 comprises two side by side rolling tracks 60, 61, which, by virtue of spring 59, cooperate respectively with rollers 52 and 53 of jaws 12 or counter-jaws 13.

The profiles of cams 50, 51 are so designed as to define a number of characteristic positions—shown in FIGS. 5 to 9 and described in detail later on—in which a jaw/counter-jaw pair interacts with tube 14, and to ensure the smoothest possible transition between said positions to prevent undesired stress on the packaging material.

Finally, counter-jaws 13 and jaws 12 comprise respective mutual engaging elements 64 and 65 as shown in detail in FIG. 10.

Element 64 substantially comprises a connecting plate 77 fitted to the front face of projection 22 of respective counter-jaw 13; and a substantially cross-shaped projection 66 defined by a vertical portion 67 substantially in the form of an isosceles trapezium with the longer edge coincident with the surface of plate 77 and having a tapered front edge 68, and by a transverse portion 69 intersecting vertical portion 67 at the center line.

Element 65, in turn, comprises a connecting plate 70 fitted to the front face of projection 21 of respective jaw 12; and a pair of vertical, substantially trapezoidal projections 73 parallel to and spaced with respect to each other to define a seat 74 for receiving, in use, portion 67 of corresponding element 64. On the respective front sides, projections 73 comprise respective recesses 75 for housing portion 69 of corresponding element 64, and defining, as a whole and with seat 74, a cross-shaped seat 76 substantially complementary to projection 66 of element 64.

Conveyors 10 and 11 also comprise respective control devices 37 for controlling the volume of packages 2 as they are being formed.

Figure 13:
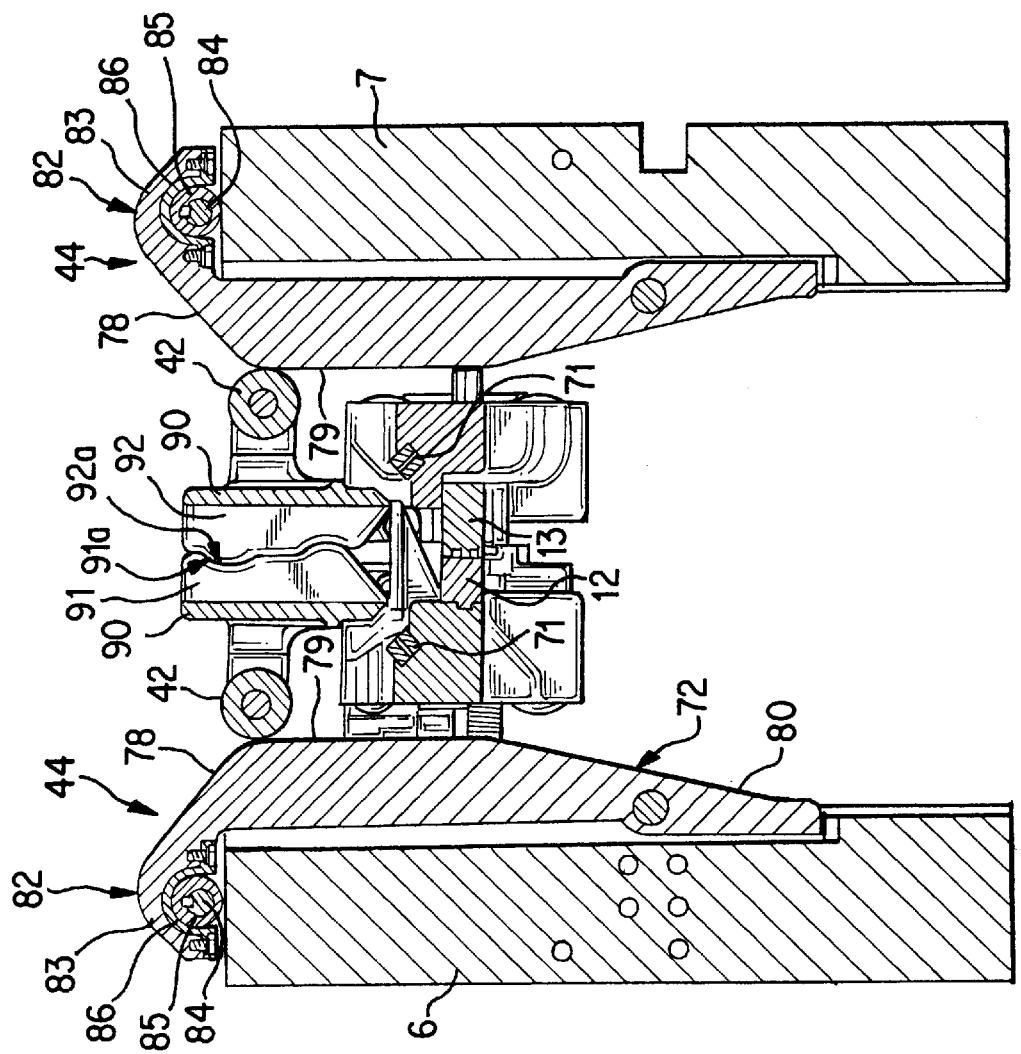
Figure 14:
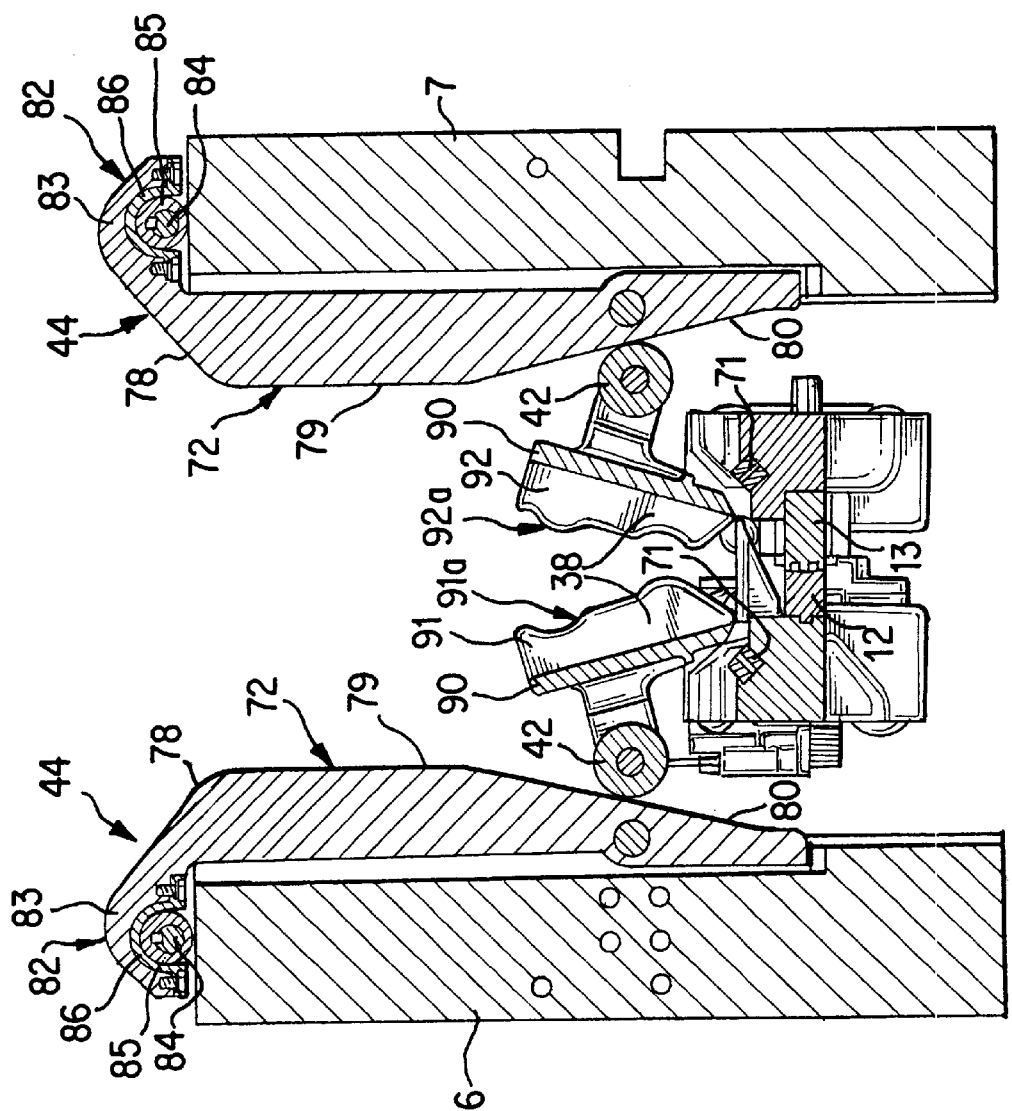

Each device 37 comprises a respective number of half shell elements 38 equal in number to jaws 12 or counter-jaws 13 and fitted to respective chain 15, 27 of conveyor 10, 11. More specifically, elements 38 of each conveyor 10 or 11 are fitted individually to respective main bodies 20 of jaws 12 or counter-jaws 13, and cooperate frontally with respective elements 38 on the other conveyor 11 or 10 to define a substantially parallelepiped cavity (FIG. 13). Each half shell element 38 is hinged to the main body 20 of respective jaw 12 or counter-jaw 13, so as to rotate about an axis 39 parallel to axes 25, 26, by two lateral supporting brackets 40 integral with element 38 and pivoting on respective pins 41 of axis 39. Pins 41 are integral with element 38, and are hinged to respective brackets 100 in turn integral with main body 20 and located close to the ends of heating element 29 or pressure bar 35.

Each element 38 comprises a flat rear wall 90 parallel to axis 39; and a pair of flat lateral walls 91, 92 extending from opposite lateral edges of wall 90 and substantially perpendicular to or slightly inclined towards wall 90.

Lateral walls 91, 92 comprise respective shaped front edges 91a, 92a substantially complementary to each other, so that edge 91a of wall 91 of element 38 of a jaw 12 substantially mates with edge 92a of wall 92 of element 38 of corresponding counter-jaw 13 (FIG. 13).

Edges 91a, 92a each comprise a curved recess 94 and a curved projection 95, which respectively mate with a projection 95 and a recess 94 on the mating edge; and edges 91a, 92a are so shaped to prevent the packaging material from being "pinched" along a respective generating line when enclosed by elements 38.

Finally, walls 91, 92 comprise respective bottom front bevels 91b, 92b for ensuring the smoothest possible impact with the packaging material as described later on.

Each element 38 comprises a cam follower roller 42 fitted idly to a supporting bracket 43 projecting integrally from wall 90 on the opposite side to walls 91, 92.

Figure 11:
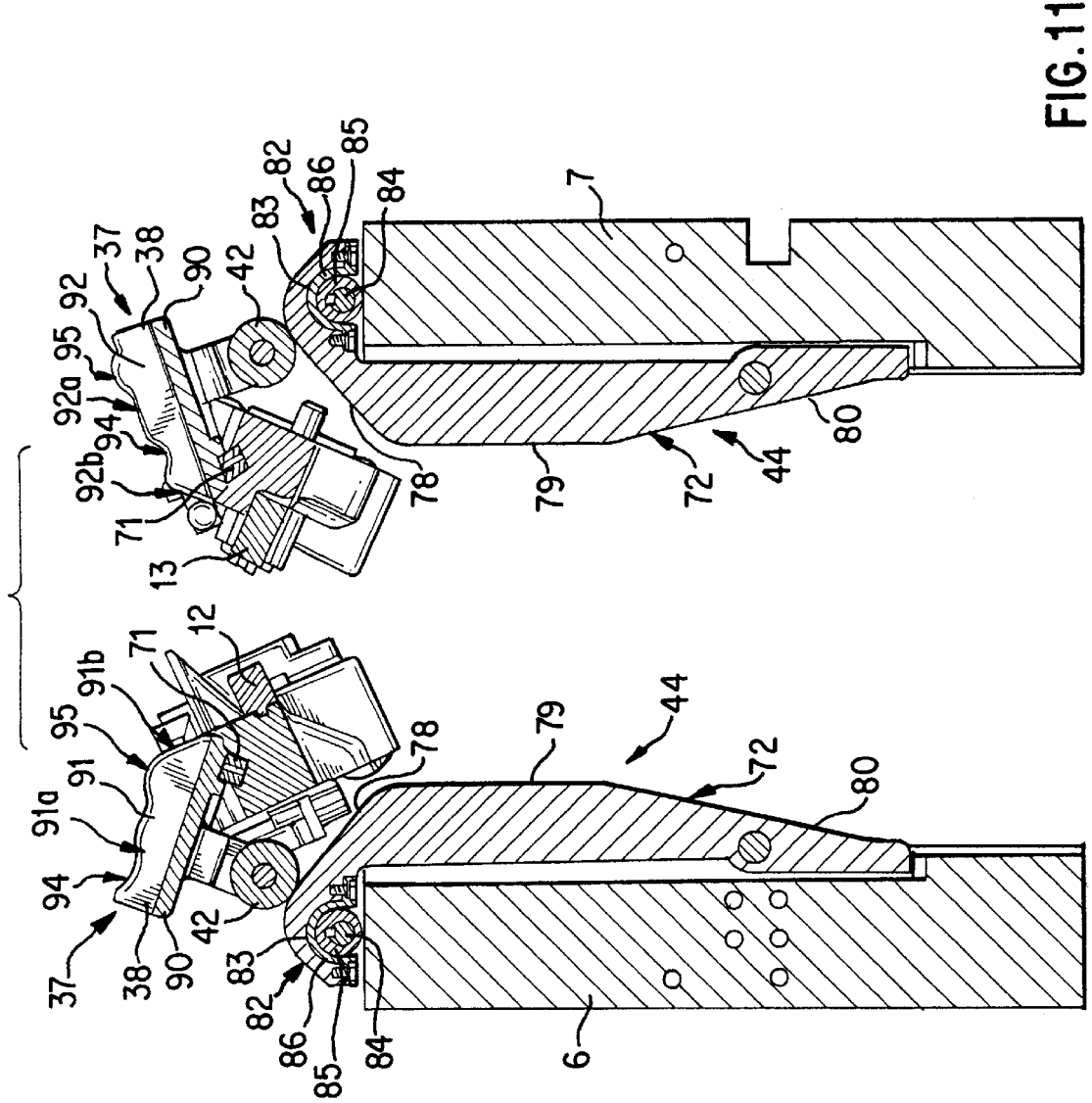
FIGS. 11, 12, 13 and 14 show package volume control devices of the FIG. 1 unit in successive operating positions.
Figure 12:
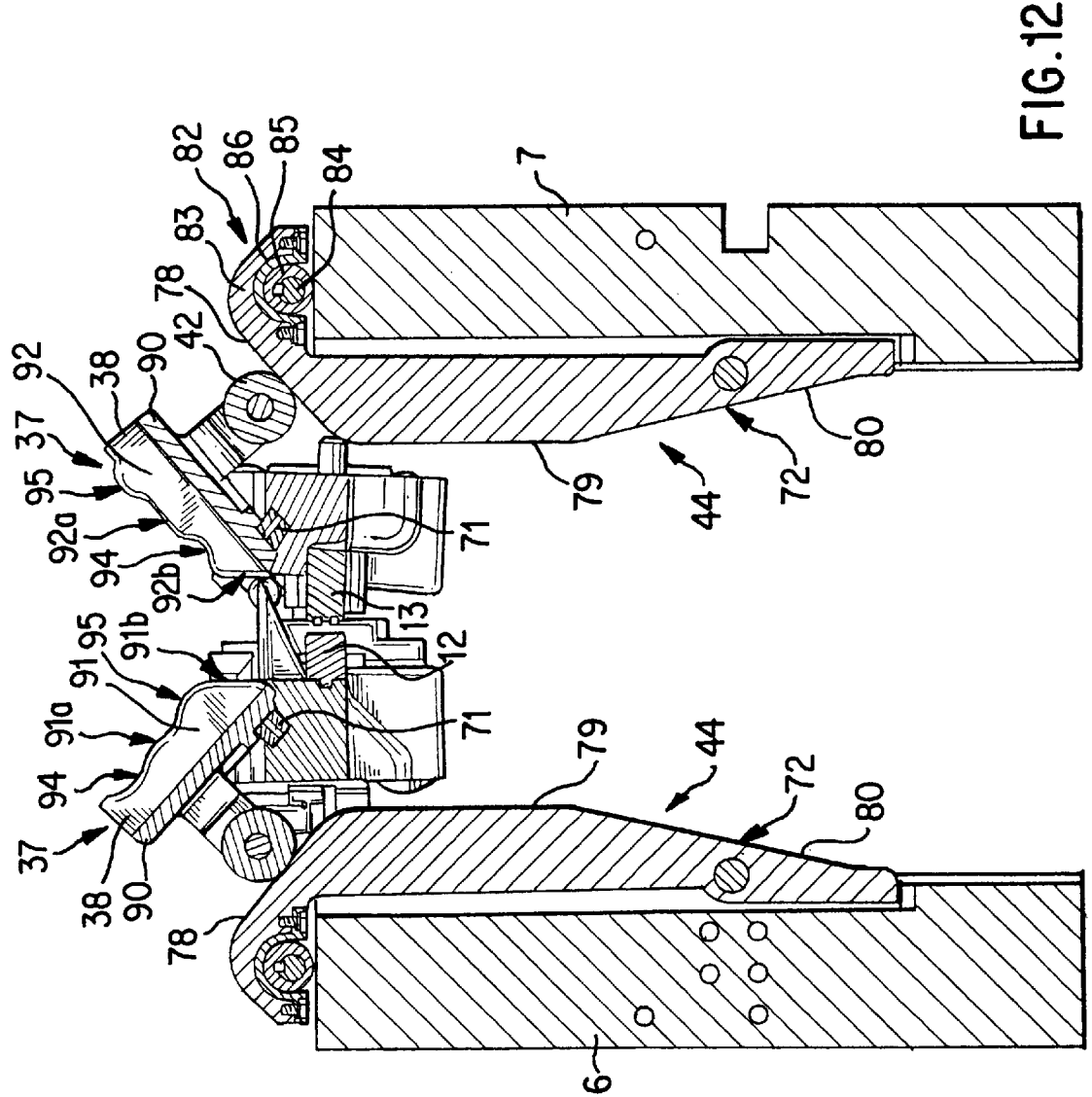

Cam followers 42 of elements 38 of jaws 12 and counter-jaws 13 cooperate with respective cams 44 fitted to respective walls 6 and 7 of frame 3 (FIGS. 11–14) along respective portions P1, Q1 and P2, Q2 of paths P and Q; and elements 38 (FIGS. 3 and 4) are loaded by springs 63, coaxial with respective pins 41, in the rotation direction wherein respective cam followers 42 are maintained contacting respective cams 44 along the above portions of paths P and Q. Along the remaining portions of paths P and Q, wherein cam followers 42 are detached from respective cams 44, elements 38 are maintained by springs 63 in an idle position wherein each cooperates with a pair of elastic pads 71 fitted to respective main body 20 (FIGS. 11 and 12).

Each cam 44 comprises a substantially trapezoidal active profile 72 (FIGS. 11 to 14) defined by a substantially straight top ramp portion 78 converging downwards with respect to path A, an intermediate portion 79 substantially parallel to path A and connected to top portion 78, and a substantially straight bottom ramp portion 80 diverging with respect to path A.

Cams 44 are provided with an adjusting device 81 (FIG. 1) permitting a limited amount of adjustment to the volume of the packages by adjusting the distance between cams 44.

Cams 44 are hinged to respective walls 6, 7 close to respective bottom portions 80.

Device 81 comprises two adjustable connecting assemblies 82 interposed between respective top ends 83 of cams 44 and respective walls 6 and 7, and each substantially comprising a control shaft 84 fitted with an eccentric portion 85.

The top end 83 of each cam 44 rests on respective eccentric portion 85 via the interposition of a substantially W-shaped support 86 fixed rigidly to cam 44, made of material with a low friction coefficient, and partly surrounding and cooperating in sliding manner with cam 85.

The two control shafts 84 of assemblies 82 are rotated in opposite directions, via respective known transmissions 87 (FIG. 1), by an electric step motor 96 forming part of device 81 and operated from a control panel (not shown) of unit 1.

Unit 1 operates as follows.

Conveyors 10, 11 are rotated in known manner in opposite directions, as indicated by the arrows in FIG. 2, so that, from the end of portions P1, Q1 of respective paths P, Q and along respective portions P2, Q2, respective jaws 12 and counter-jaws 13 cooperate with tube 14 of packaging material according to a movement defined by the profiles of cams 50, 51.

More specifically, FIG. 5 shows the packaging material impact position, i.e. the position in which a jaw 12/counter-jaw 13 pair begins interacting with tube 14. The impact position is established as jaw 12 and corresponding counter-jaw 13 reach the start of respective end portions T of portions 50a, 51a (i.e. of portions P1, Q1 of respective paths P, Q), and is characterized by a predetermined tube 14 impact angle a formed between the plane defined by axes 25, 26 and the vertical mid plane of unit 1 containing path A of tube 14, and which ranges between 0 and 60 degrees, conveniently between 20 and 30 degrees, and is preferably of about 25 degrees.

Portions T of cams 50, 51 are so formed as to feed jaw 12 and counter-jaw 13 along a substantially curved trajectory into a mating position (FIG. 6) in which they are positioned facing and parallel to each other, but separated by a distance substantially equal to twice the thickness of the packaging material, so that tube 14 is flattened at a respective cross section, but not yet subjected to pressure.

Only after jaw 12 and counter-jaw 13 are moved into the above mating position is pressure gradually applied by the slight ramps S formed by cams 50, 51 immediately upstream from respective portions 50b, 51b.

Figures 7, 8:
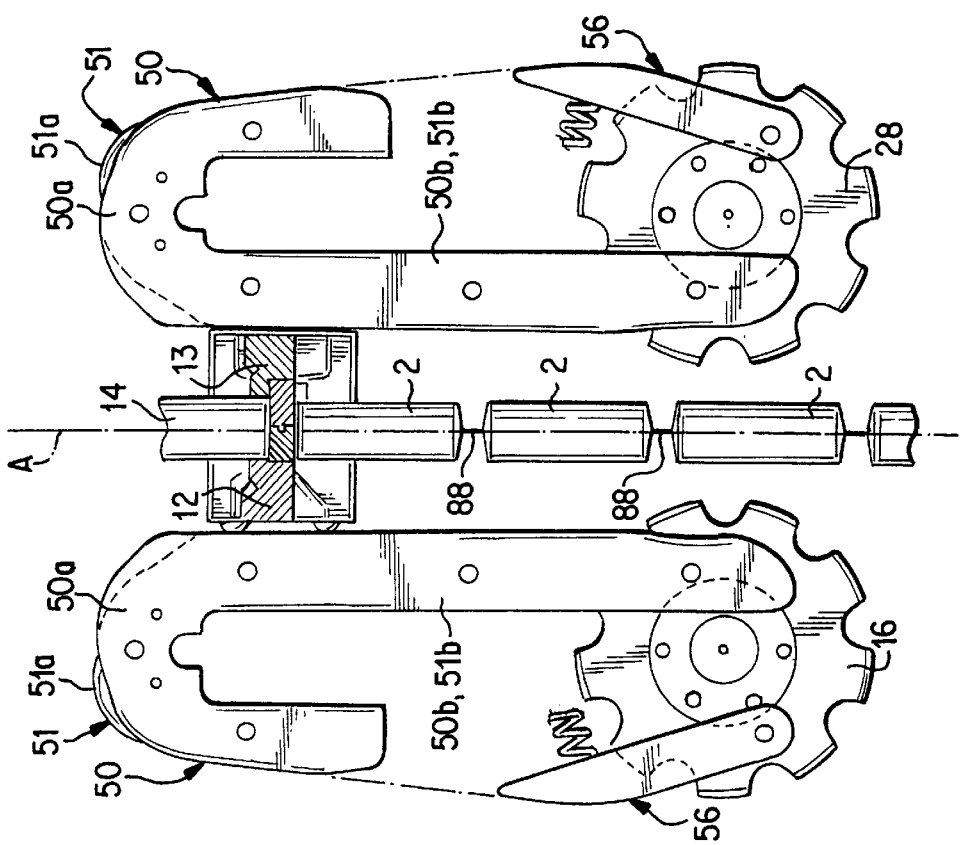

FIGS. 7 and 8 respectively show jaw 12 and counter-jaw 13 at the start and end of the maximum-pressure stage, during which, heating element 29 is supplied by brushes 34 to locally melt the thermoplastic covering of the packaging material. The supply to heating element 29 is cut off before the end of the maximum-pressure stage, so that the thermoplastic covering begins cooling and setting to form the seal while still under pressure, thus ensuring perfect sealing of the package.

At the end of the maximum-pressure stage, jaw 12 and counter-jaw 13 are parted slightly for a brief pressure-release stage, during which (FIG. 9), jaw 12 and counter-jaw 13 are maintained almost parallel to each other to avoid abnormally stressing the packaging material.

On leaving respective portions 50b, 51b of cams 50, 51, by which time substantially no forces are exchanged any longer between jaw 12 and counter-jaw 13, these are detached from the packaging material by the drive wheels meshing with pins 23, 24.

Along portions P2, Q2 of paths P, Q, each jaw 12 and corresponding counter-jaw 13 are locked to each other laterally and in the traveling direction by engagement of respective elements 65 and 64.

FIGS. 11 to 14 show the operating sequence of devices 37 for controlling the volume of packages 2.

FIG. 11 shows the position of elements 38 upon jaw 12 and corresponding counter-jaw 13 contacting the tube of packaging material as shown in FIG. 5.

In this position, cam followers 42 of elements 38 cooperate with top portions 78 of respective cams 44, but elements 38 are still "open" and therefore do not interact with the packaging material.

As jaw 12 and counter-jaw 13 travel along respective paths P and Q, cam followers 42 travel along top portions 78 of cams 44 to gradually rotate elements 38 about respective axes 39 and towards tube 14 of packaging material.

FIG. 12 shows the initial contact position of lateral walls 91, 92 of elements 38, which is established close to the mating position of jaw 12 and counter-jaw 13 shown in FIG. 6. Initial contact substantially occurs at bevels 91b, 92b of walls 91, 92, so as to define a fairly ample initial contact region between each wall 91, 92 and the packaging material, and so distribute the contact pressure as to reduce the unit stress on the material.

The mating or "closing" movement of elements 38 about tube 14 of packaging material terminates as cam followers 42 reach substantially vertical intermediate portions 79 of respective cams 44 (FIG. 13), which occurs when the packaging material is already gripped firmly by jaw 12 and counter-jaw 13, and just before the next jaw and counter-jaw move into contact with tube 14 of packaging material.

Elements 38 enclose the tube of packaging material until the next jaw and counter-jaw move into the mating position shown in FIG. 6 to define the volume of the product inside the package being formed.

Subsequently, cam followers 42 of elements 38 reach bottom portions 80 of respective cams 44, along which, elements 38 are gradually opened and detached from the packaging material.

The above operating cycle results in the formation of a continuous succession of packages 2 joined to one another by connecting bands 88, which are cut at a follow-up work station 89 not forming part of the present invention and therefore not described.

The volume of packages 2 may be adjusted within a limited range by means of device 81.

Should the product volume of packages 2 be found to be outside a predetermined range—e.g. by statistically analyzing the net weight of a batch of finished packages—electric motor 96 may be operated from the control panel of the unit to rotate a given number of steps in one direction or the other, so as to rotate eccentric portions 85 of connecting assemblies 82 by the same angle in opposite directions, so that the active profiles 72 of cams 44, and more specifically intermediate portions 79, are moved substantially towards or away from each other.

The advantages of unit 1 according to the present invention will be clear from the foregoing description.

The action of half shells 38 obtainable by connecting them individually and movably to respective jaws 12 or counter-jaws 13, and by controlling their trajectory by means of cams 44, provides for optimizing the interaction of elements 38 with the packaging material, and so ensuring the packaging material remains undamaged and the package perfectly aseptic.

The shape of walls 91, 92 of elements 38 prevents the material from being overstressed locally at the initial impact stage—thanks to bevels 91b, 92b—and from being "pinched" at the closing stage of elements 38—thanks to the shape of edges 91a, 92a.

Finally, adjusting device 81 provides for adjusting the volume of the packages in a straightforward, effective, reliable manner.

Clearly, changes may be made to unit 1 as described and illustrated herein without, however, departing from the scope of the present claims.

I claim:

1. A packaging unit for continuously producing aseptic sealed packages, containing a portable food product, from a tube made of heat-seal packaging material in sheet form and fed along a vertical supply path, said tube being filled with said food product, said unit comprising:

a first chain conveyor having a number of jaws and defining an endless first path along which said jaws are fed;

a second chain conveyor having a number of counter-jaws and defining an endless second path along which said counter-jaws are fed;

said first path and said second path each comprising respective work portions adjacent to said supply path of the tube of packaging material and extending substantially symmetrically on opposite sides of said supply path, so that said jaws of said first conveyor cooperate with respective counter-jaws of said second conveyor along at least part of the respective said work portions to grip said tube at respective equally spaced cross sections;

at least said jaws comprising heating means for heat-sealing said tube;

said chain conveyors comprising respective volume control devices for controlling the volume of the packages being formed, and each of which volume control devices comprises a number of half shell elements cooperating with respective half shell elements on the other chain conveyor to define the volume of the packages being formed;

each of said half shell elements are movably fitted to respective jaws and counter-jaws for relative movement toward and away from said supply path;

wherein said half shell elements are each hinged to a single respective jaw and counter-jaw at only a single axis each and not connected to the adjacent upstream and downstream jaw and counter-jaw for movement about respective axes perpendicular to said tube supply path, said relative movement of said half shell elements comprising rotation about the respective axes;

said volume control devices also comprising, for each chain conveyor, guide means extending along said work portions of the respective paths for guiding said half shell elements and for controlling said relative movement of said half shell elements.

2. A unit according to claim 1, wherein said guide means for guiding said half shell elements comprises a cam for each chain conveyor, said half shell elements each comprising cam follower means cooperating with each cam.

3. A unit according to claim 2, wherein each cam comprises:

a first ramp portion converging with respect to said tube supply path sized and configured to gradually move each half shell element on one of said chain conveyors towards the corresponding half shell element on the other said chain conveyor;

an intermediate portion substantially parallel to said tube supply path sized and configured to maintain a closed position of said half shell element about said tube of packaging material; and a third ramp portion diverging with respect to said supply path sized and configured to gradually detach said half shell element from said packaging material.

4. A unit according to claim 1, wherein said half shell elements each comprise a pair of lateral walls having shaped front edges, the shape of the edge of one lateral wall being complementary to the shape of the edge of the other lateral wall.

5. A unit according to claim 4, wherein said lateral walls comprise respective bevels at respective portions positioned on said lateral walls to first contact said tube of packaging material.

6. A unit according to claim 1, further comprising means for adjusting the volume of said packages.

7. A unit according to claim 6, wherein said means for adjusting the volume of said packages comprises means for adjusting the relative position of said cams.

8. A unit according to claim 7, wherein said cams each include opposite ends, said cams being hinged close to said ends to respective fixed walls of said unit said means for adjusting the relative position of said cams comprising adjustable connecting means interposed between said cam opposite ends and said respective fixed walls.

9. A packaging unit for continuously producing aseptic sealed packages, containing a portable food product, from a tube made of heat-seal packaging material in sheet form and fed along a vertical supply path, said tube being filled with said food product, said unit comprising:

a first chain conveyor having a number of jaws and defining an endless first path along which said jaws are fed;

a second chain conveyor having a number of counter-jaws and defining an endless second path along which said counter-jaws are fed;

said first path and said second path each comprising respective work portions adjacent to said supply path of the tube of packaging material and extending substantially symmetrically on opposite sides of said supply path, so that said jaws of said first conveyor cooperate with respective counter-jaws of said second conveyor along at least part of the respective said work portions to grip said tube at respective equally spaced cross sections;

at least said jaws comprising heating means for heat-sealing said tube;

said chain conveyors comprising respective volume control devices for controlling the volume of the packages being formed, and each of which volume control devices comprises a number of half shell elements cooperating with respective half shell elements on the other chain conveyor to define the volume of the packages being formed;

each of said half shell elements are fitted to respective jaws and counter-jaws for relative movement toward and away from said tube supply path;

said volume control devices comprising, for each chain conveyor, guide means extending along said work portions of the respective paths for guiding said half shell elements and for controlling said relative movement of said half shell elements;

means for adjusting the volume of said packages comprising. means for adjusting the relative position of said cams;

wherein said cams each include opposite ends, said cams being hinged close to said ends to respective fixed walls of said unit, said means for adjusting the relative position of said cams comprising adjustable connecting means interposed between said cam opposite ends and said respective fixed walls; comprises:

eccentric portions cooperating with said cam supporting means;

an electric control motor; and transmission means interposed between said electric motor and said eccentric portions to rotate said eccentric portions in opposite directions in response to rotation of said electric motor.

* * * * *